ns011046228B2

(12) United States Patent
Shin (10) Patent No.: US 11,046,228 B2
(45) Date of Patent: Jun. 29, 2021

(54) CUP HOLDER FOR VEHICLE

(71) Applicant: NIFCO KOREA, INC., Chungcheongnam-do (KR)

(72) Inventor: Youn Hwan Shin, Chungcheongnam-do (KR)

(73) Assignee: NIFCO Korea, Inc.

( * ) Notice: Subject to any disclaimer, the term of this patent is extended or adjusted under 35 U.S.C. 154(b) by 124 days.

(21) Appl. No.: 16/556,437

(22) Filed: Aug. 30, 2019

(65) Prior Publication Data

US 2020/0070707 A1 Mar. 5, 2020

(30) Foreign Application Priority Data

Aug. 30, 2018 (KR) .................. 10-2018-0102879

(51) Int. Cl.
*B60N 3/10* (2006.01)
*B60R 7/04* (2006.01)

(52) U.S. Cl.
CPC . *B60N 3/10* (2013.01); *B60R 7/04* (2013.01)

(58) Field of Classification Search
CPC .................................. B60N 3/10; B60R 7/04
See application file for complete search history.

(56) References Cited

U.S. PATENT DOCUMENTS

| 5,170,980 | A | 12/1992 | Burrows et al. |
| 5,791,618 | A * | 8/1998 | Lancaster ............. B60N 3/106 248/311.2 |
| 7,487,945 | B2 * | 2/2009 | Liu ........................ B60N 3/106 248/311.2 |
| 8,469,246 | B2 | 6/2013 | Lee et al. |
| 9,469,231 | B2 * | 10/2016 | Kang ..................... B60N 3/102 |
| 9,919,634 | B2 * | 3/2018 | Flothmann ............. B60N 3/108 |
| 10,875,437 | B2 * | 12/2020 | Lee ........................ B60N 3/106 |
| 2005/0001127 | A1 | 1/2005 | Schaal |
| 2011/0315730 | A1 | 12/2011 | Lee et al. |

FOREIGN PATENT DOCUMENTS

KR 100747356 B1 8/2007

OTHER PUBLICATIONS

Office Action relating to Korean Patent Application No. 10-2018-0102879 dated Nov. 13, 2019, 6 pages.
Extended European Search Report dated Jan. 16, 2020 relating to European Patent Application No. 19194265.5, 7 pages.

* cited by examiner

*Primary Examiner* — Anita M King
(74) *Attorney, Agent, or Firm* — Stinson LLP (57) ABSTRACT

A cup holder for a vehicle that stably supports a cup stored in a hole of the cup holder regardless of the size of the cup and prevents the beverage from spilling out of the cup with the cup stored in the hole released from the hole or falling on a side. Such cup holder comprises a storage tray, a cup support installed rotatably in one or the other direction in a storage space formed in the storage tray, a flap link making a back-and-forth movement while compressing a link spring, and an auxiliary cup support having a lower end rotating around a hinge axis rotatably coupled to a flap housing and an upper portion drawn into or out of the storage space depending on the amount of the back-and-forth movement of the flap link.

5 Claims, 8 Drawing Sheets

CUP HOLDER FOR VEHICLE

CROSS REFERENCE TO RELATED APPLICATION

This application claims priority to Korean Patent Application No. KR 10-2018-0102879, filed Aug. 30, 2018, the entire disclosure of which is incorporated herein by reference for all purposes.

TECHNICAL FIELD

The present invention relates to a cup holder for a car, and more particularly, a cup holder that stably supports a cup stored in a hole of the cup holder regardless of the size of the cup and prevents the beverage from spilling out of the cup with the cup stored in the hole released from the hole or falling on a side.

BACKGROUND

Typically, a cup holder is provided in the interior of a car or other vehicle for a passenger in the car to store and support a beverage can, a cup, etc. (hereinafter referred to as a cup), and the user may store the cup in the cup holder when necessary after the beverage is taken.

Such a cup holder is provided to allow safe driving by preventing the cup from falling on a side or being shaken when the vehicle is running, and is formed on a crash pad or a console box or attached to a predetermined part of the vehicle.

The simplest structure of conventional cup holders is the one where a hole is formed on the upper surface of a crash pad or a console box to simply store a cup. Such a cup holder cannot store cups of various sizes or support a cup in a stable manner.

In other words, a size of a cup that could be stored is fixed because the hole is formed on a console box with a fixed size. In particular, when the size of the cup and the hole do not match, the cup is released from the hole or falls one a side to spill the beverage out of the cup and contaminate the interior of the car, which serves as a factor that can cause an accident while driving.

Accordingly, in order to support a cup more stably, US Patent Application Publication No. 2005/0001127 and U.S. Pat. No. 5,170,980 disclose a feature that a rotatable cup support is installed in a hole in which a cup is stored.

In particular, the cup holder of US Patent Application Publication No. 2005/0001127 comprises: a cup support (divider) comprising a wall that rotates around a z-axis to divide a storage compartment and passing around approximately 180 degrees, and a rotary plate; a torsion spring for rotating the divider; and a diameter-compensating flap that rotates by operation of a button to release the divider.

Accordingly, when the user presses the button downward, the diameter-compensation flap is rotated in conjunction with this to release the divider, and as a result, the divider is rotated counterclockwise to be in a state in which a cup can be supported.

However, when a cup with a small outer diameter is stored in the hole in which a cup is stored, such a conventional cup holder for a car also had problems of contamination of the interior of the vehicle by spilling the beverage with the cup stored in the hole released from the hole or falling on a side and of acting as a factor that can cause an accident while driving.

SUMMARY

An object of the present invention is to provide a cup holder for a car that stably supports a cup and keeps the cup stored even when various cups of different sizes are stored in a storage space with an auxiliary cup support drawn into or out of the storage space depending on the rotation amount of a cup support rotated in the storage space of a storage tray such that the auxiliary cup support is brought into contact with the outer lateral surface of the cup stored in the storage space to have the cup supported.

In an aspect, a cup holder comprises a storage tray, a cup support installed rotatably in one or the other direction in a storage space formed in the storage tray, a flap link making a back-and-forth movement while compressing a link spring, and an auxiliary cup support having a lower end rotating around a hinge axis rotatably coupled to a flap housing and an upper portion drawn into or out of the storage space depending on the amount of the back-and-forth movement of the flap link.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

The present invention seeking the object above is achieved by comprising: a storage tray 100 in which a storage space 111 for storing a cup is formed; a cup support 200 installed rotatably in one or the other direction in the storage space 111 formed in the storage tray 100; a flap link 300 making a back-and-forth movement while compressing a link spring 600 depending on the rotation amount of the cup support 200; an auxiliary cup support 500 installed, the lower end of the auxiliary cup support 500 rotating around a hinge axis 510 rotatably coupled to a flap housing 400 and the upper portion thereof being drawn into or out of the storage space 111 depending on the amount of the back-and-forth movement of the flap link 300.

Meanwhile, it is noted that the cup support 200 comprises: a bottom portion 220 rotating around an axis in the storage space 111 of the storage tray 100; a support portion 210 which is erected from the bottom portion 220 and supports the outer circumferential surface of a cup in close contact therewith; and a guide rib 230 formed, in a non-circular shape with the starting end and the finishing end thereof having different widths, at the bottom surface of the bottom portion 220 from which the support portion 210 is erected such that the guide rib 230 protrudes outward.

Additionally, it is noted that a coupling protrusion 320 into which the other side of the link spring 600 one side of which is supported by the flap housing 400 is inserted, and a connecting protrusion 310 brought into contact with the auxiliary cup support 500, the lower end of the auxiliary cup support 500 rotating around the hinge axis 510 rotatably coupled to the flap housing 400, are formed on the flap link 300 making a back-and-forth movement with a side thereof in contact with the guide rib 230.

Meanwhile, it is noted that a sub-flap spring 700 which causes the auxiliary cup support 500 to continuously provide an elastic force toward the storage tray 100 is installed between the auxiliary cup support 500 installed on the flap housing 400 to be rotatable around the hinge axis 510 and the flap link 300 such that the auxiliary cup support 500 is provided with a constant elastic force and rotates around the hinge axis 510 towards the storage tray 100, thereby stably supporting the cup stored in the storage space 111 of the storage tray 100.

Additionally, it is noted that an oil damper 130 which adjusts the rotation speed of the cup support 200 rotatably installed in the storage space 111 is operably installed by a damper screw 140 on the bottom surface of the storage tray 100, and a flap spring 240 which causes the cup support 200 to rotate is installed to be fixed and not to be released by a hinge cap 250 on the center portion of the bottom portion 220 of the cup support 200 installed in the storage space 111 such that the rotation speed is adjusted by the oil damper 130, the hinge cap 250 maintaining a state of being installed to be fixed to the storage tray 100 by a hinge screw 260.

According to the present invention, when a passenger in a car operates a button in a state where a cup is stored in a storage space of a storage tray, a cup support is rotated by the button in one direction to support the cup while, at the same time, the upper portion of an auxiliary cup support is drawn into the storage space to stably support the cup stored in the storage space of the storage tray, thereby achieving, for example, an effect of stably supporting and storing various types of cups of different sizes stored in the storage space of the storage tray, which makes the present invention a very useful invention.

Hereinafter, the technical configuration of the present invention is described in detail with reference to the accompanying drawings.

Figure 1:
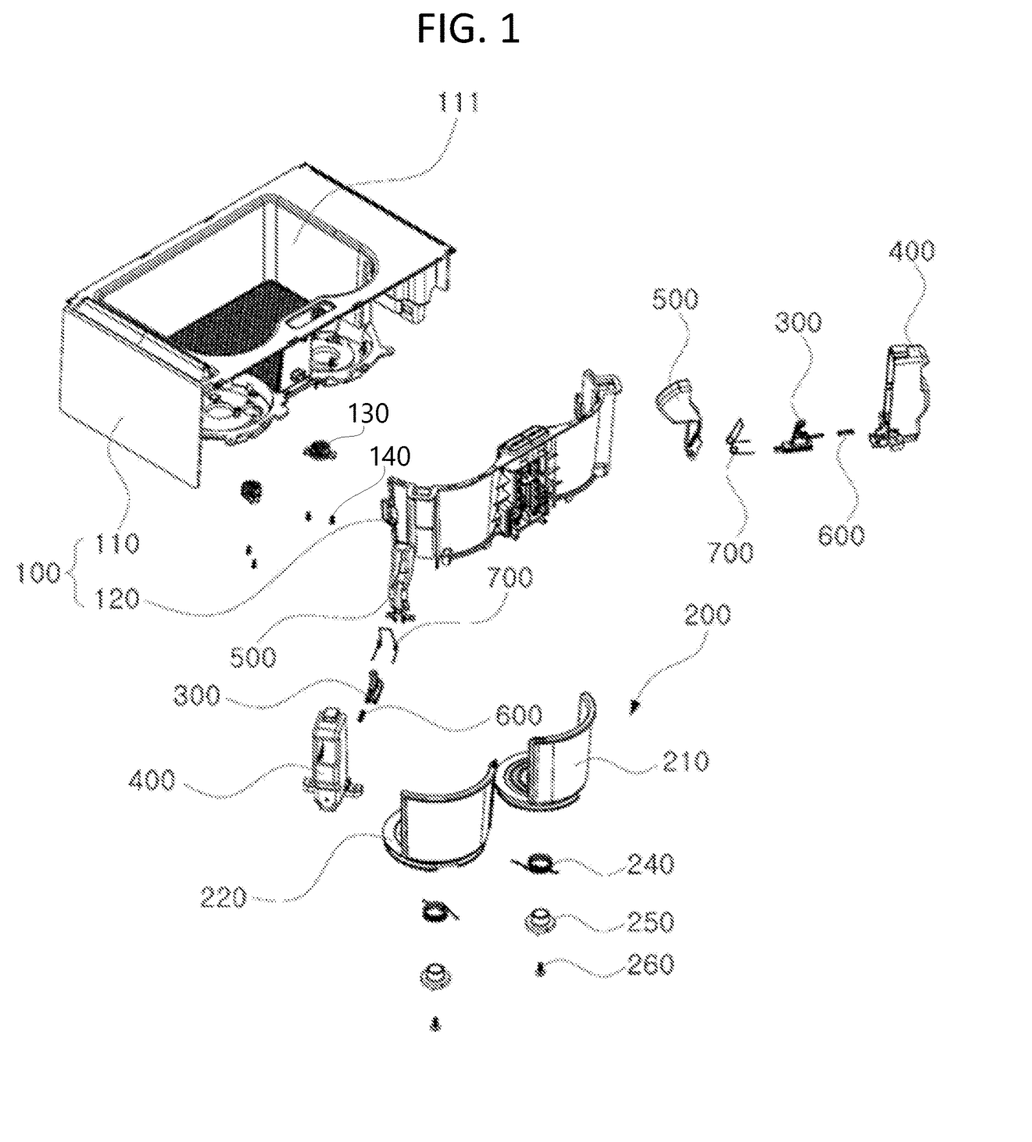
FIG. 1 is an exploded perspective view showing the configuration of a cup holder for a car according to the present invention.
Figure 2:
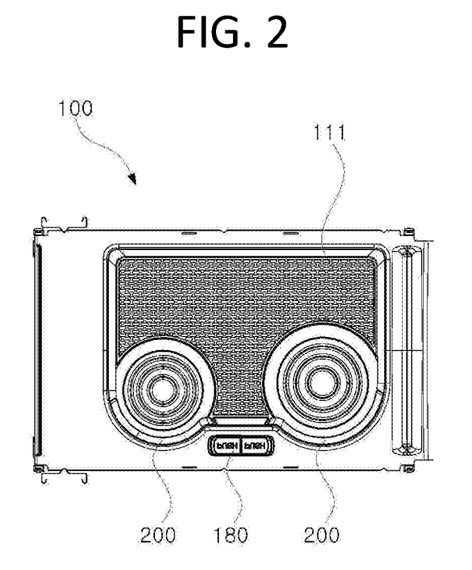
FIG. 2 is a plane view showing a cup holder for a car according to the present invention.
Figure 3:
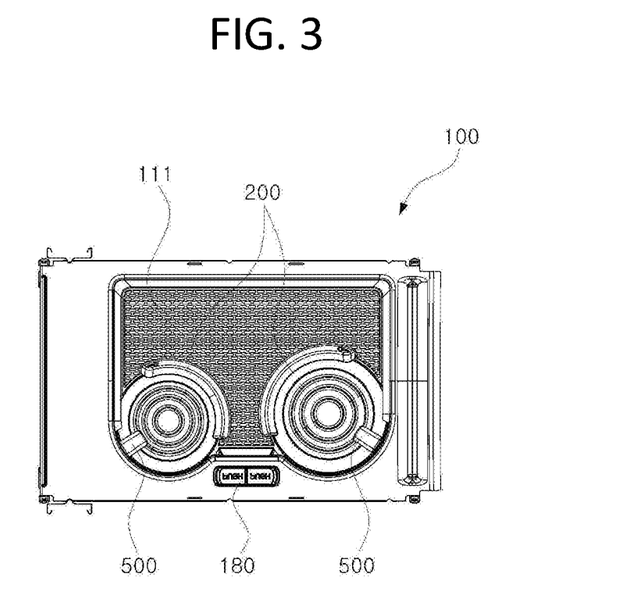
FIG. 3 is a plane view showing a state in which a cup support and an auxiliary cup support of a cup holder for a car according to the present invention are operated to support a cup.
Figure 4:
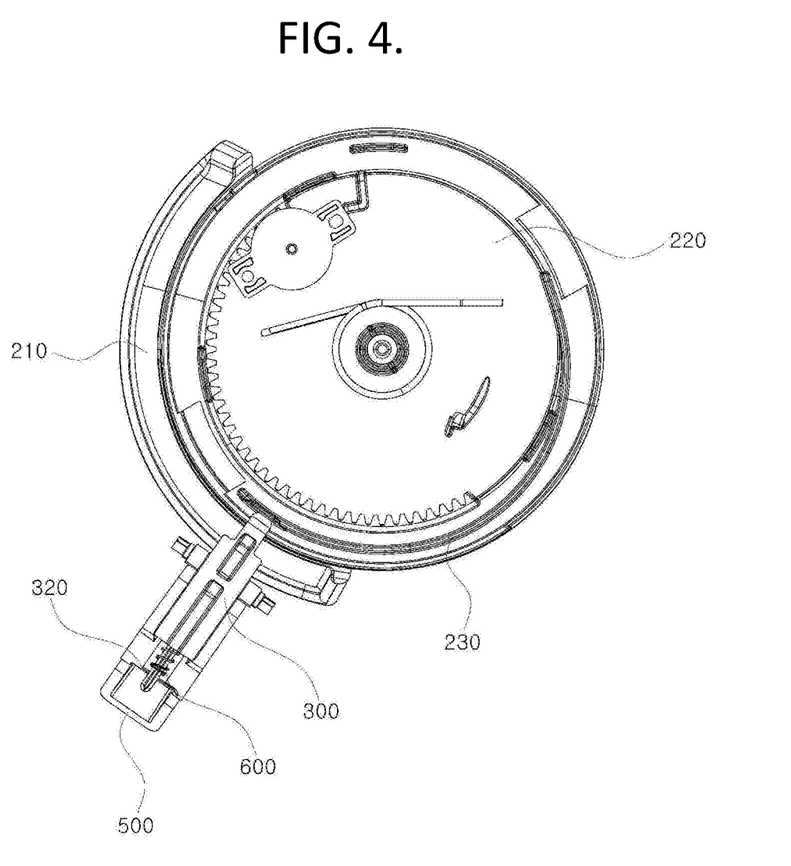
FIG. 4 is a bottom view showing a cup support of a cup holder for a car according to the present invention.
Figure 5:
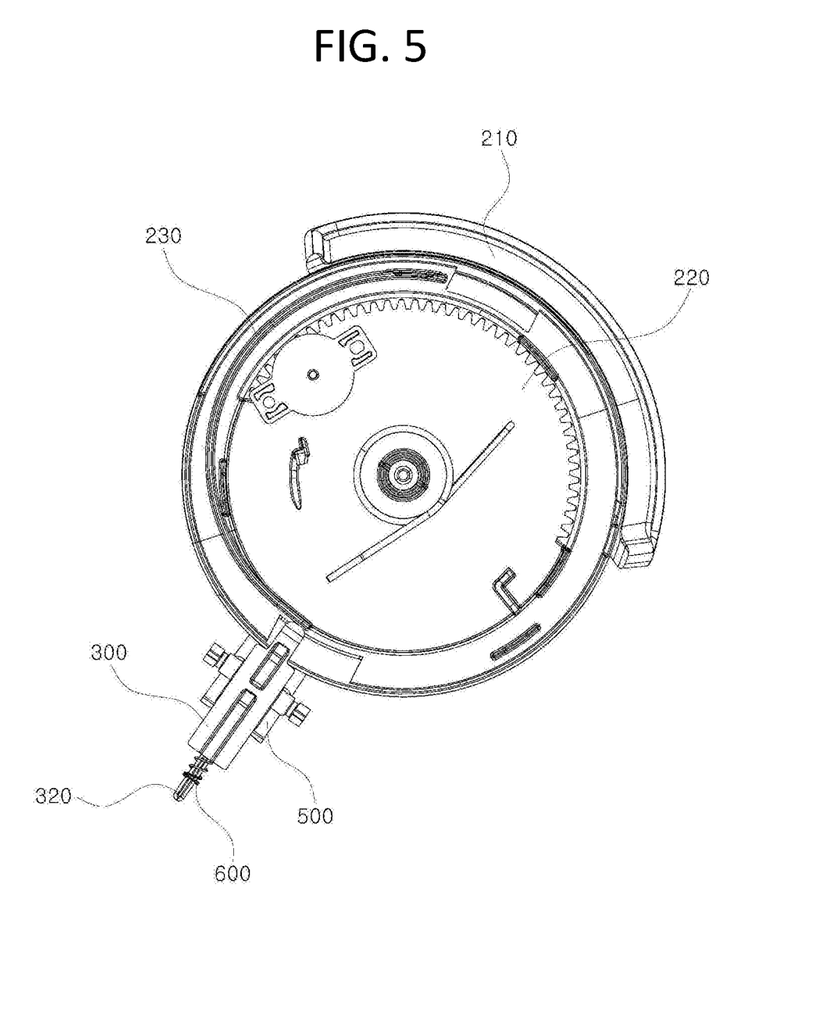
FIG. 5 is a bottom view showing a state in which a cup support of a cup holder for a car according to the present invention is rotated to support a cup.
Figure 6:
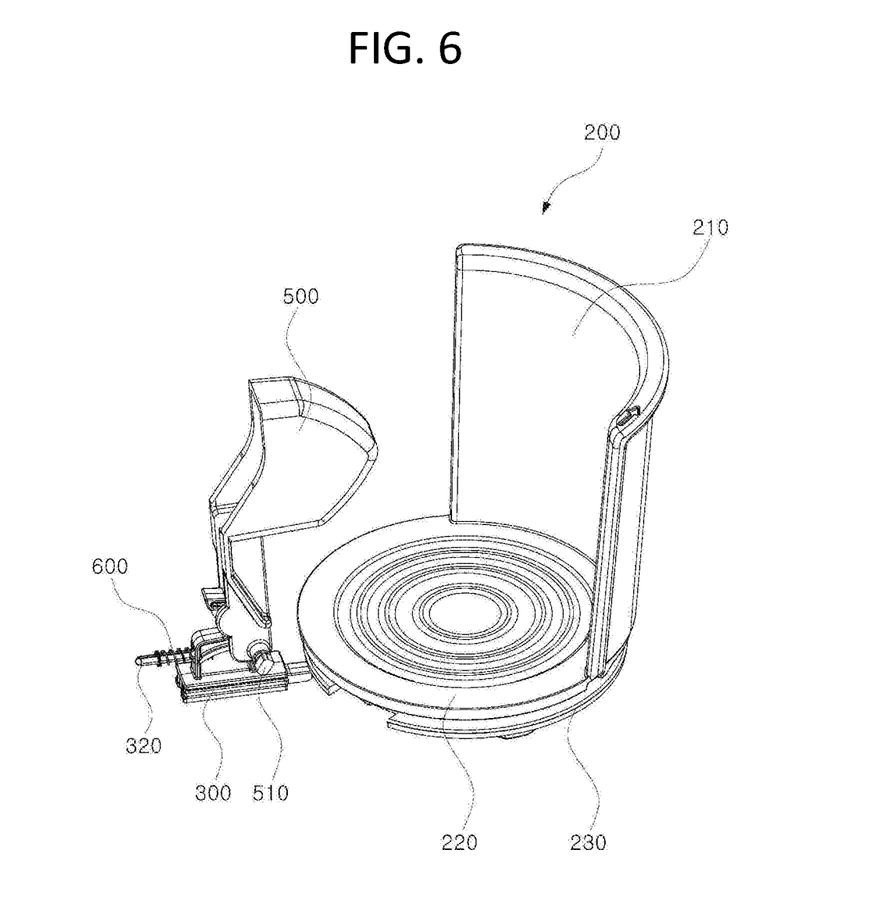
FIG. 6 is a front view showing a state of an auxiliary cup support before a cup support of a cup holder for a car according to the present invention is rotated.
Figure 7:
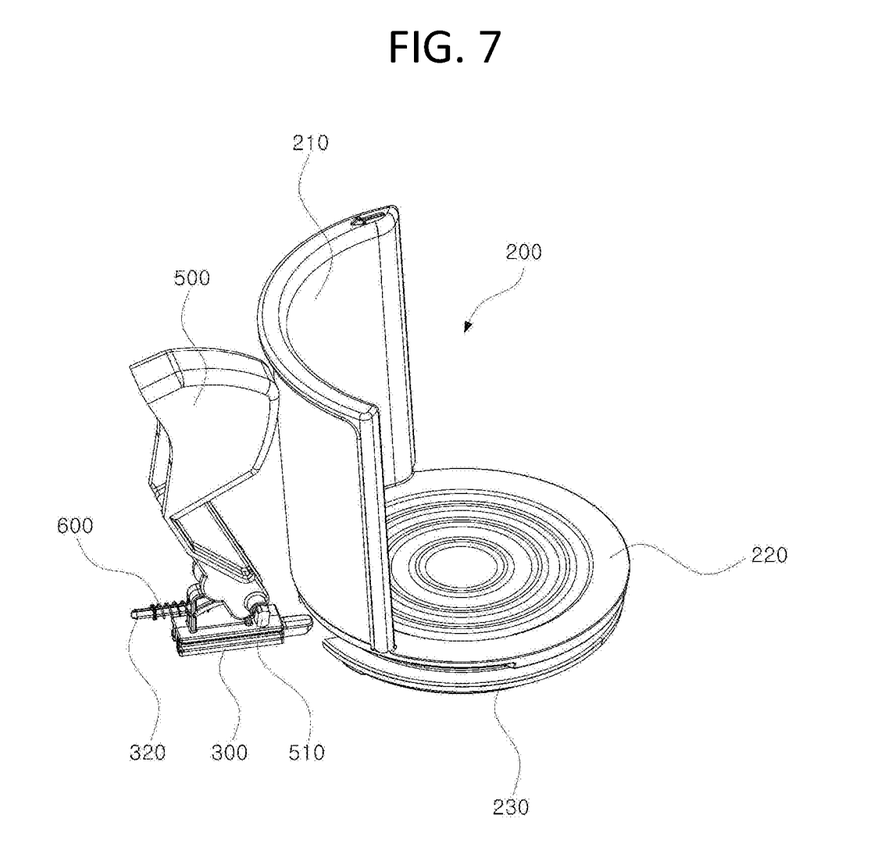
FIG. 7 is a front view showing a state in which a cup support of a cup holder for a car according to the present invention is rotated for an auxiliary cup support to support a cup.
Figure 8:
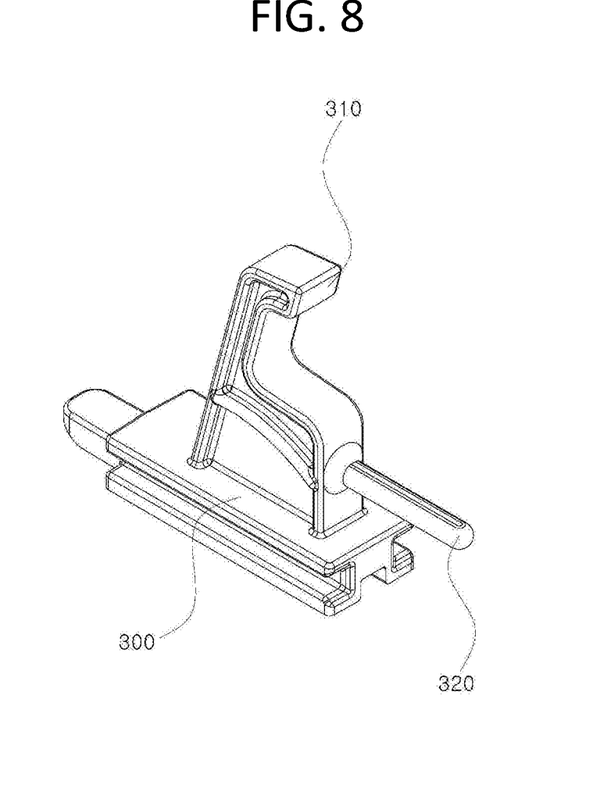
FIG. 8 is a perspective view showing a flap link for a cup holder for a car according to the present invention.

FIG. 1 is an exploded perspective view showing the configuration of a cup holder for a car according to the present invention. FIG. 2 is a plane view showing a cup holder for a car according to the present invention. FIG. 3 is a plane view showing a state in which a cup support and an auxiliary cup support of a cup holder for a car according to the present invention are operated to support a cup. FIG. 4 is a bottom view showing a cup support of a cup holder for a car according to the present invention. FIG. 5 is a bottom view showing a state in which a cup support of a cup holder for a car according to the present invention is rotated to support a cup. FIG. 6 is a front view showing a state of an auxiliary cup support before a cup support of a cup holder for a car according to the present invention is rotated. FIG. 7 is a front view showing a state in which a cup support of a cup holder for a car according to the present invention is rotated for an auxiliary cup support to support a cup. FIG. 8 is a perspective view showing a flap link for a cup holder for a car according to the present invention.

As shown in FIGS. 1 to 8, a cup holder for a car according to the present invention comprises: a storage tray 100 in which a storage space 111 for storing a cup (not shown) is formed; a cup support 200 installed rotatably in one or the other direction in the storage space 111 formed in the storage tray 100; a flap link 300 making a back-and-forth movement while compressing a link spring 600 depending on the rotation amount of the cup support 200; an auxiliary cup support 500 installed, the lower end of the auxiliary cup support 500 rotating around a hinge axis 510 rotatably coupled to a flap housing 400 and the upper portion thereof being drawn into or out of the storage space 111 depending on the amount of the back-and-forth movement of the flap link 300.

Meanwhile, the cup support 200 comprises: a bottom portion 220 rotating around an axis in the storage space 111 of the storage tray 100; a support portion 210 which is erected from the bottom portion 220 and supports the outer circumferential surface of a cup in close contact therewith; and a guide rib 230 formed, in a non-circular shape with the starting end and the finishing end thereof having different widths, at the bottom surface of the bottom portion 220 from which the support portion 210 is erected such that the guide rib 230 protrudes outward.

Additionally, a coupling protrusion 320 into which the other side of the link spring 600 one side of which is supported by the flap housing 400 is inserted, and a connecting protrusion 310 brought into contact with the auxiliary cup support 500, the lower end of the auxiliary cup support 500 rotating around the hinge axis 510 rotatably coupled to the flap housing 400, are formed on the flap link 300 making a back-and-forth movement with a side thereof in contact with the guide rib 230.

Meanwhile, a sub-flap spring 700 which causes the auxiliary cup support 500 to continuously provide an elastic force toward the storage tray 100 is installed between the auxiliary cup support 500 installed on the flap housing 400 the lower end of the auxiliary cup support 500 being rotatable around the hinge axis 510 and the flap link 300.

Additionally, an oil damper 130 which adjusts the rotation speed of the cup support 200 rotatably installed in the storage space 111 is operably installed by a damper screw (140) on the bottom surface of the storage tray 100, and a flap spring 240 which causes the cup support 200 to rotate is installed to be fixed and not to be released by a hinge cap 250 on the center portion of the bottom portion 220 of the cup support 200 installed in the storage space 111 such that the rotation speed is adjusted by the oil damper 130, the hinge cap 250 being installed to be fixed to the storage tray 100 by a hinge screw 260.

In the present invention configured as above, the oil damper 130 is fixed using the damper screw 140 in a state where the oil damper 130 is seated on the bottom surface of the storage tray 100 in which a tray housing 120 is coupled to a small tray 110 to form the storage space 111.

After the oil damper 130 is installed using the damper screw 140, the cup support 200 is seated in the storage space 111.

In this case, with the bottom portion 220 of the cup support 200 seated to rotate around an axis, the support portion 210 erected from the bottom portion 220 is drawn into or out of the storage space 111 to support the outer lateral surface of a cup stored in the storage space 111.

After the cup support 200 is seated in the storage space 111, the flap spring 240 which causes the cup support 200 to rotate, the hinge cap 250 which prevents the flap spring 240 from being released, and the hinge screw 260 which maintains a state where the hinge cap 250 is coupled to the bottom surface of the storage tray 100 are sequentially coupled.

After rotatably installing the cup support 200 in the storage tray 100 by the hinge screw 260 as above, a side of the link spring 600 is seated on the flap housing 400 and the coupling protrusion 320 of the flap link 300 is inserted into the other side of the link spring 600, followed by compressor assembly.

Then, the flap link 300 and the auxiliary cup support 500 are connected such that the auxiliary cup support 500 is elastically supported by the sub-flap spring 700, and the hinge axis 510 formed at the lower end of the auxiliary cup support 500 is rotatably inserted into the flap housing 400.

When the auxiliary cup support 500 is assembled with the flap housing 400 as above, the flap housing 400 is coupled to the tray housing 120 such that the flap link 300 makes a back-and-forth movement in a state where a side of the flap link 300 is in contact with the guide rib 230 formed on the bottom portion 220 of the cup support 200 in a non-circular shape with the starting end and the finishing end thereof having different widths such that the guide rib 230 protrudes outward.

Accordingly, when a passenger in a car operates a button 180 in a state where a cup with contents held therein is stored in the storage space 111 of the storage tray 100, the cup support 200 rotates around an axis in one direction while the operation speed is adjusted by the oil damper 130 such that the cup support 200 is drawn into the storage space 111 to support the cup.

If the cup support 200 is rotated in one direction to be drawn into the storage space 111 as above, the flap link 300 is moved along the guide rib 230 formed on the bottom surface of the bottom portion 220 of the cup support 200 toward the flap housing 400 while compressing the link spring 600. The lower portion of the auxiliary cup support 500 is rotated around the hinge axis 510 by the amount of the movement toward the flap housing 400, and the upper portion of the auxiliary cup support 500 is positioned while being elastically supported by the sub-flap spring 700 toward the storage space 111 to support the outer lateral surface of the cup stored in the storage space 111 of the storage tray 100.

Meanwhile, after the cup is withdrawn from the storage space 111, when a passenger in the car operates the button 180 to have the cup support 200 rotate in the other direction, the cup support 200 rotates around the axis in the other direction while the operation speed is adjusted by the oil damper 130. When the cup support 200 is rotated in the other direction, the flap link 300 is moved by the elastic force of the link spring 600 along the guide rib 230 formed on the bottom surface of the bottom portion 220 of the cup support 200. The lower portion of the auxiliary cup support 500 is rotated around the hinge axis 510 by the amount of the movement of the flap link 300, and the upper portion thereof is pulled toward the outer lateral side of the storage space 111 of the storage tray 100 to maintain a state of being fixed.

DESCRIPTION OF REFERENCE NUMERALS

100: storage tray
111: storage space
130: oil damper
140: damper screw
200: cup support
210: support portion
220: bottom portion
230: guide rib
240: flap spring
250: hinge cap
260: hinge screw
300: flap link
310: connecting protrusion
320: coupling protrusion
400: flap housing
500: auxiliary cup support
510: hinge axis
600: link spring
700: sub-flap spring When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A cup holder for a vehicle, comprising:
   a storage tray in which a storage space for storing a cup is formed;
   a cup support installed rotatably in one or the other direction in the storage space formed in the storage tray;
   a flap link installed to make a back-and-forth movement while compressing a link spring depending on the rotation amount of the cup support; and
   an auxiliary cup support installed, a lower end of the auxiliary cup support rotating around a hinge axis rotatably coupled to a flap housing and an upper portion thereof being drawn into or out of the storage space depending on the amount of the back-and-forth movement of the flap link.

2. The cup holder according to claim 1, wherein the cup support comprises:
   a bottom portion in the storage space of the storage tray rotating around an axis;
   a support portion which is erected from the bottom portion and supports the outer circumferential surface of a cup in close contact therewith; and
   a guide rib formed, in a non-circular shape with a starting end and a finishing end thereof having different widths, at the bottom surface of the bottom portion from which the support portion is erected such that the guide rib protrudes outward.

3. The cup holder according to claim 1, wherein a coupling protrusion into which the other side of the link spring one side of which is supported by the flap housing is inserted, and a connecting protrusion brought into contact with the auxiliary cup support installed, the lower end of the auxiliary cup support rotating around the hinge axis rotatably coupled to the flap housing and the upper portion thereof being drawn into or out of the storage space depending on the amount of the back-and-forth movement of the flap link, are formed on the flap link making a back-and-forth movement with a side thereof in contact with the guide rib.

4. The cup holder according to claim 1, wherein a sub-flap spring which causes the auxiliary cup support to continuously provide an elastic force toward the storage tray is installed between the auxiliary cup support installed, the lower end of the auxiliary cup support rotating around the hinge axis rotatably coupled to a flap housing and the upper portion thereof being drawn into or out of the storage space depending on the amount of the back-and-forth movement of the flap link, and the flap link.

5. The cup holder according to claim 1, wherein an oil damper which adjusts the rotation speed of the cup support rotatably installed in the storage space is operably installed by a damper screw on the bottom surface of the storage tray, and a flap spring which causes the cup support to rotate is installed to be fixed and not to be released by a hinge cap on the center portion of the bottom portion of the cup support installed in the storage space such that the rotation speed is adjusted by the oil damper, the hinge cap being installed to be fixed to the storage tray by a hinge screw.

\* \* \* \* \*